United States Patent [19]
Akesaka

[11] Patent Number: 4,830,539
[45] Date of Patent: May 16, 1989

[54] PIPE PROPELLING APPARATUS

[75] Inventor: Toshio Akesaka, Yokohama, Japan

[73] Assignee: Kabushiki Kaisha Iseki Kaihatsu Koki, Tokyo, Japan

[21] Appl. No.: 241,964

[22] Filed: Sep. 8, 1988

[30] Foreign Application Priority Data
Dec. 7, 1987 [JP] Japan .................. 62-307686

[51] Int. Cl.$^4$ .................. E02F 5/16; E21B 11/00; E21D 9/00; E21D 9/06
[52] U.S. Cl. .................. 405/184; 175/171; 175/257; 175/320; 254/29 R; 405/142; 405/174
[58] Field of Search ............. 405/184, 174, 142, 141, 405/145; 175/320, 321, 257, 171, 215; 254/29 R

[56] References Cited
U.S. PATENT DOCUMENTS

| 3,613,384 | 10/1971 | Jacobs | 405/142 |
| 3,708,984 | 1/1973 | Coleman | 405/184 X |
| 4,297,055 | 10/1981 | Peacock | 405/184 |
| 4,388,020 | 6/1983 | Uemura | 405/184 X |
| 4,452,550 | 6/1984 | Hofmeester | 405/174 X |
| 4,624,605 | 11/1986 | Akesaka | 405/184 X |

FOREIGN PATENT DOCUMENTS

| 0861529 | 9/1981 | U.S.S.R. | 175/257 |
| 1263795 | 10/1986 | U.S.S.R. | 175/171 |
| 0999822 | 7/1965 | United Kingdom | 405/184 |

Primary Examiner—Dennis L. Taylor
Assistant Examiner—P. M. Frechette
Attorney, Agent, or Firm—Mattern, Ware, Stoltz & Fressola

[57] ABSTRACT

An apparatus for propelling a plurality of pipes arranged in series comprises basic thrusting means for generating a thrust to be applied to the pipes and intermediate thrusting means for receiving the thrust from the basic thrusting means and applying the received thrust to one of the pipes. The intermediate thrusting means includes a press head provided with a portion displaceable to a position where the portion is capable of abutting against the rear end face of one of the pipes when the intermediate thrusting means is advanced while displaceable to another position where the portion does not interfere with the advance of the following pipes when the intermediate thrusting means is removed and an intermediate body extending rearward from the press head such as to receive the thrust from the basic thrusting means and apply the received thrust to the press head.

5 Claims, 3 Drawing Sheets

PIPE PROPELLING APPARATUS

BACKGROUND OF THE INVENTION

1. Field of the Invention

This invention relates to a pipe propelling apparatus suited for constructing a pipeline in the ground and, more particularly to, an apparatus for propelling a plurality of pipes arranged in series in the ground.

2. Description of the Prior Art

A pipe propelling apparatus for constructing a pipeline in the ground generally comprises a shield tunnelling machine for excavating earth and sand and a basic thrusting mechanism for pressing sequentially a plurality of pipes into a space obtained by excavating the earth and sand by the tunnelling machine such as to dispose the pipes in the space while advancing the pipes together with the tunnelling machine.

According to the pipe propelling apparatus of this type, a thrust or driving force is applied to the rearmost pipe from the basic thrusting mechanism to advance all pipes together with the tunnelling machine. Therefore, the thrust necessary for advancing the pipes and tunnelling machine is increased in proportion to the total length of pipes to be propelled, i.e., a distance between vertical shafts. As a result, a large thrust acts on the pipes, particularly on the rearmost pipe. When the large thrust acts on the pipe as mentioned above, it is liable to break the pipe. If the mechanical strength of the pipe is enhanced in order to prevent the pipe from breakage, the cost of the pipe becomes high. Thus, when the pipeline is constructed in the ground by the pipe propelling apparatus, the distance between the vertical shafts cannot be enlarged.

To overcome the problem as noted above, there is proposed a pipe propelling apparatus which is provided with an intermediate thrusting mechanism for applying the thrust as mentioned above to one pipe other than the rearmost pipe.

This pipe propelling apparatus gives the thrust not only to the rearmost pipe, but also to one of intermediate pipes through the intermediate thrusting mechanism. However, according to this pipe propelling apparatus, the intermediate thrusting mechanism has to be finally disassembled and removed, and therefore this pipe propelling apparatus can be applied when constructing a pipeline of such size that an operator can enter.

SUMMARY OF THE INVENTION

An object of the present invention is to provide the pipe propelling apparatus which can expand a distance between vertical shafts when constructing a small diameter pipeline without enhancing the mechanical strength of the pipe.

A pipe propelling apparatus according to the present invention for propelling a plurality of pipes arranged in series in the ground comprises basic thrusting means for generating a thrust to be applied to the pipes and intermediate thrusting means for receiving the thrust generated from the basic thrusting means to apply the received thrust to one of the pipes, wherein the intermediate thrusting means includes a press head provided with a portion displaceable to a position where the portion bears against the rear end of one of the pipes when the intermediate thrusting means is advanced, while displaceable to another position where the portion does not interfere with the advance of the following pipe when the intermediate thrusting means is removed and an intermediate body extending rearward of the press head so as to receive the thrust from the basic thrusting means and apply the received thrust to the press head.

The thrust provided by the basic thrusting means acts on the rearmost pipe and the intermediate pipe. Therefore, according to the present invention, a distance between a starting shaft and a terminal shaft can be elongated without enhancing the mechanical strength of the pipe.

The press head can be removed by withdrawing rearward without being disassembled, so that the pipe propelling apparatus according to the present invention can be applied when constructing a small diameter pipeline of such size that the operator cannot enter.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
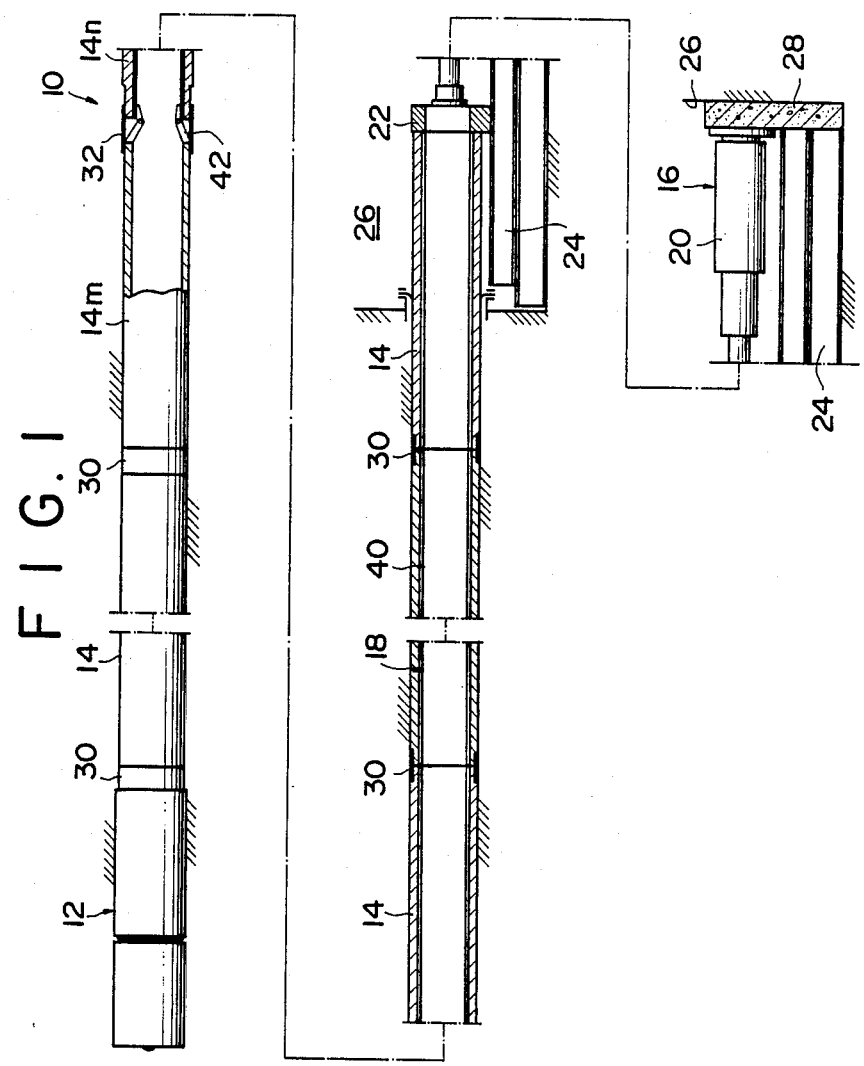
FIG. 1 shows an embodiment of a pipe propelling apparatus according to the present invention.

A pipe propelling apparatus 10 shown in FIG. 1 comprises an excavating machine 12 for excavating earth and sand, a basic thrusting mechanism 16 for press-fitting a plurality of pipes 14 in series into a space obtained by excavating the earth and sand by the excavating machine 12 and an intermediate thrusting mechanism 18 for transmitting a thrust or driving force generated by the basic thrusting mechanism 16 to one 14m of the pipes other than the rearmost pipe.

The excavating machine 12 is a known shield tunnelling machine for excavating the earth and sand while being advanced by receiving a thrust through each pipe 14 from the basic thrusting mechanism 16. Thus, the excavating machine 12 comprises a tubular shield body, a cutter head disposed at the front end of the shield body to be rotatable around the axis of the shield body, a rotary mechanism for rotating the cutter head, a plurality of direction correcting jacks for adjusting the excavating direction, and a muck processing mechanism for processing the excavated earth and sand or the like. Such excavating machines are disclosed in U.S. Pat. Nos. 4,630,869, 4,655,493, 4,692,062 or the like, for example.

The basic thrusting mechanism 16 comprises a plurality of multiple stage jacks 20 operated synchronously, a slider 22 reciprocated by the operation of each jack 20 to transmit a thrust to the rearmost pipe when the excavating machine is advanced and a guide 24 for restricting the movement of the slider. The basic thrusting mechanism 16 is disposed in a starting shaft 26. In the shaft 26 is constructed a wall 28 for reaction. The basic thrusting mechanism 16 as noted above is also disclosed in U.S. Pat. No. 4,662,606.

A known collar 30 is disposed in a connection between adjacent pipes 14 except for a connection between a pipe 14m, to which the thrust is applied from the intermediate thrusting mechanism 18, and a pipe 14n disposed next to the pipe 14m. Each collar 30 has an inward flange portion provided at the inside of a tubular portion for receiving an end of the pipe 14 and extending from the inner peripheral surface of the tubular portion along a plane orthogonal to the axis of the tubular portion. The flange portion is adapted to bear against the end face of the pipe inserted into the tubular portion. Another collar 30 of the same type is also disposed in a connection between the excavating machine 12 and the foremost pipe 14.

Figure 2:
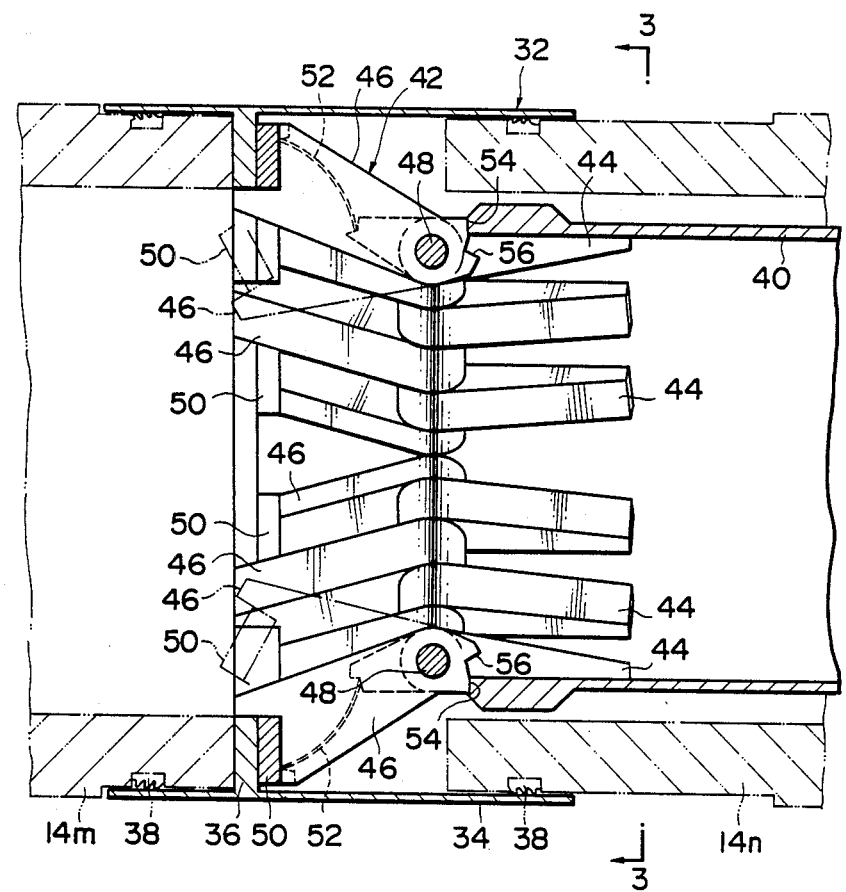
FIG. 2 is a sectional view showing an embodiment of a press head.

As shown in FIG. 2, a collar 32 is disposed in the connection between the pipe 14m, to which the thrust is applied from the intermediate thrusting mechanism 18, and the pipe 14n disposed next to the pipe 14m. This collar 32 resembles collar 30 in that the collar 32 has an inward flange portion 36 provided at the inside of a tubular portion 34 for receiving an end of the pipe 14 and extending from the inner peripheral surface of the tubular portion along a plane orthogonal to the axis of the tubular portion. However, the collar 32 differs from the collar 30 in that the length of the tubular portion 34 is larger than that of the collar 30.

As shown in FIG. 2, a seal member 38 for maintaining liquid tightness between the collars 30,32 and the pipe 14 is disposed in both ends of each pipe 14.

The intermediate thrusting mechanism 18 comprises a tubular intermediate body or a tubular relay body 40 extending coaxially into each pipe behind the pipe 14m to which the thrust is applied from the intermediate thrusting mechanism 18. On an end of the relay body 40 is disposed a press head 42 for pressing the rear end of the pipe 14m. The relay body 40 is provided with a plurality of tubular members having the same length as that of one pipe 14. Each tubular member is connected separatably to each other in series by a plurality of bolts and nut such as to receive the thrust from the basic thrusting mechanism 16 and apply the received thrust to the press head 42. Also, when a new pipe is disposed between the rearmost pipe and the basic thrusting mechanism 16, the front end of a new tubular member is connected removably to the rear end of the rearmost tubular member. The rear end of the rearmost tubular member is adapted to bear against the front end face of the slider 22 of the basic thrusting mechanism 16 and then receives the thrust from the front end face of the slider.

Figure 3:
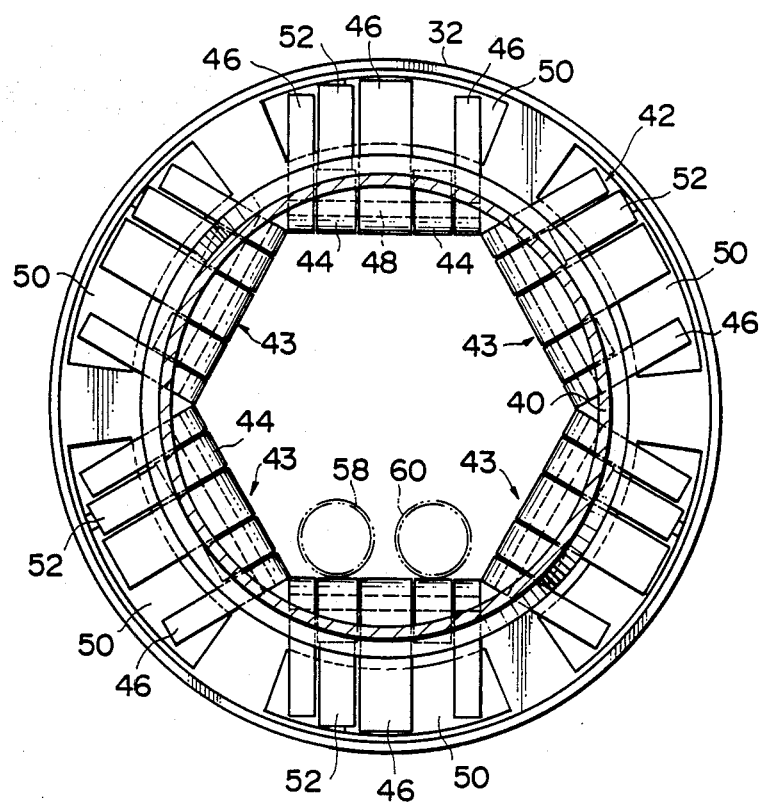
FIG. 3 is a sectional view taken along the line 3—3 in FIG. 2.

As shown in FIGS. 2 and 3, the press head 42 comprises a plurality of claw assemblies 43 disposed at the front end of the relay body 40 so as to be arranged at equal angular intervals around the axis of the relay body 40. Each claw assembly 43 is provided with a plurality of support members 44 fixed at the front end of the relay body 40 to be spaced from each other in the direction an imaginary axis extending in a plane perpendicular to the axis of the pipes 14, a plurality of claws 46 projecting forward from the relay body 40, a shaft 48 for permitting the rear end of the claw 46 to be supported by the support member 44 such as to angularly rotate the claw 46 about the imaginary axis orthogonal to the axis of the relay body 40, a plate 50 for connecting the front ends of the claws 46 to each other and a leaf spring 52 for giving a force for permitting the claw 46 to rotate about the shaft 48 to the claw 46.

Each claw 46 includes a boss provided on the rear end of the claw and adapted for receiving the shaft 48. Each boss is provided with a stopper portion 54 abutting against the front end face of the relay body when a force acts on the claw 46 in the direction of opening each claw 46, i.e., in the direction of separating the respective plates 50 from each other and another stopper portion 56 abutting against the inner surface of the front end of the relay body 40 when a force acts on the claw 46 in the direction of closing each claw 46, i.e., in the direction of approaching the respective plates 50 to each other.

The leaf spring 52 is disposed between the front end of the support member 44 and the rear end of the plate 50. Therefore, when the position of the plate 50 engaging the leaf spring 52 is outside the extension of a line interconnecting the position of the support member 44 engaging the leaf spring 52 and the rotary center of the claw 46, i.e., when the claw 46 is disposed at the side of the position shown by the continuous line in FIG. 2, the force of the leaf spring 52 acts on the claw 46 to open the claw 46. On the other hand, when the position of the plate 50 engaging the leaf spring 52 is inside the extension of the line as mentioned above, i.e., when the claw 46 is disposed at the side of the position shown by the two-dot chain line in FIG. 2, the force of the leaf spring 52 acts on the claw 46 to close the claw 46.

When the pipe 14 is propelled, the intermediate thrusting mechanism 18 is not used until a predetermined number of pipes are completely press fitted in the excavated space in the ground, so that each pipe 14 is advanced by the thrust applied from the slider 22 of the basic thrusting mechanism 16 to the rearmost pipe.

When the predetermined number of pipes are press fitted in the excavated space, the collar 32 is fitted onto the rear end of the pipe 14m and the intermediate thrusting mechanism 18 which is in the state of being inserted into the next pipe 14n is disposed between the pipe 14m and the slider 22, together with the pipe 14n. Then, the pipe 14n and intermediate thrusting mechanism 18 are pressed toward the pipe 14m by the actuation of the basic thrusting mechanism 16. Thereby, the front end of the pipe 14n is fitted in the collar 32.

Before the intermediate thrusting mechanism 18 is pressed toward the pipe 14m, each claw 46 of the intermediate thrusting mechanism 18 is rotated to the position shown by the continuous line in FIG. 2. Thus, since each claw 46 is opened by the force of the leaf spring 52 such that the plate 50 of the intermediate thrusting mechanism 18 is opposed to the pipe 14m and thus the flange 36 of the collar 32, the plate 50 is pressed against the flange 36 of the collar 32.

Further, as shown in FIG. 3, pipes 58,60 for transporting the excavated earth and sand, a power line for rendering the excavating machine 12 to be operative, a signal line for controlling the excavating machine or the like are adapted to pass through the relay body 40.

When the intermediate thrusting mechanism 18 is arranged as shown in FIG. 2, the thrust generated by extending the jack 20 of the basic thrusting mechanism 16 is applied through the intermediate thrusting mechanism 18 and collar 32 to the pipe 14m, in addition to the rearmost pipe. Thus, each pipe disposed in front of the pipe 14n is advanced by the thrust applied through the intermediate thrusting mechanism 18 and collar 32 to the pipe 14m, whereas each pipe disposed behind the pipe 14m is advanced by the thrust directly applied from the mechanism 16 to the rearmost pipe.

The thrust acting on the intermediate thrusting mechanism 18 is applied from the relay body 40 through each support member 44, shaft 48, claw 46 and plate 50 to the collar 32. Thus, the force for moving the plate 50 further toward a main body portion of the collar 32, i.e., the force for opening the claw 46 acts on the claw 46. However, since the stopper portion 54 of the claw 46 abuts against the front end face of the relay body 40, the claw 46 is not further opened. Accordingly, collar 32 is less liable to be broken by the plate 50 or the claw 46.

Figure 4:
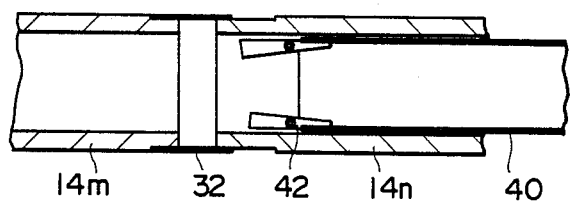
FIG. 4 shows the press head when an intermediate thrusting mechanism is removed.

When the intermediate thrusting mechanism 18 is removed, the rear end of the relay body 40 is connected to the slider 22 of the basic thrusting mechanism 16 and then the basic thrusting mechanism 16 is actuated in the opposite direction to the above mentioned direction, i.e., in the direction of drawing back the intermediate thrusting mechanism 18. Then, since the claw 46 of the intermediate thrusting mechanism 18 is drawn back in such state that the back of the claw is brought into contact with the front end of the relay body 40, as shown in FIG. 4, the claw 46 is rotated to be closed and then drawn back into the following pipe. Therefore, the press head 42 does not need to be disassembled in the pipe.

When the tubular member at the rearmost portion of the relay body 40 is completely drawn back in the shaft 26, the rearmost tubular member is removed from the next tubular member and then removed from the shaft 26.

Thereafter, the operation for drawing back the intermediate thrusting mechanism 18 by an amount corresponding to the length of one tubular member constituting the relay body 40 and the operation for separating the rearmost tubular member from the other tubular members and removing the separated tubular member from the shaft 26 are repeated until the press head 42 of the intermediate thrusting mechanism 18 is drawn back into the shaft 26.

What is claimed is:

1. A pipe propelling apparatus for propelling a plurality of pipes disposed in series, comprising:
   basic thrusting means for generating a thrust to be applied to said pipes; and
   intermediate thrusting means for receiving said thrust from the basic thrusting means and applying the received thrust to one of said pipes;
   wherein the intermediate thrusting means includes a press head provided with a portion displaceable to a position where said portion is capable of abutting against the rear end face of said one of pipes when the intermediate thrusting means is advanced while displaceable to another position where said portion does not interfere with the advance of the following pipes when the intermediate thrusting means is removed and an intermediate body extending rearward from said press head such as to receive said thrust from said basic thrusting means and apply the received thrust to said press head.

2. A pipe propelling apparatus as claimed in claim 1, wherein said press head comprises a plurality of claw assemblies disposed at the front end of said intermediate body and arranged at equal angular intervals around the axis of said pipe, each claw assembly being provided with at least one claw extending forward from the front end of said intermediate body along said axis and supported by said intermediate body to be rotatable angularly about an axis crossing said axis and a spring for giving to said claw a force adapted for rotating said claw to a position in which the front end of the claw is capable of being in contact with the rear end face of one of said pipes.

3. A pipe propelling apparatus as claimed in claim 2, wherein said claw is provided with a stopper portion abutting against the front end of said intermediate body to limit the angular rotation of said claw.

4. A pipe propelling apparatus as claimed in claim 1, wherein said press head comprises a plurality of claw assemblies disposed at the front end of said intermediate body and arranged at equal angular intervals around the axis of said pipe, each claw assembly being provided with a plurality of support members fixed at the front end of said intermediate body to be spaced from each other in the direction of an imaginary axis extending in a plane inclined to the axis of said pipes, at least one claw projecting forward from said intermediate body, a shaft permitting said support member to support the rear end of said claw such that the claw is rotated angularly about the imaginary axis and a leaf spring for giving to said claw a force adapted for rotating said claw about said shaft such that said claw abuts against the rear end of one of said pipes.

5. A pipe propelling apparatus as claimed in claim 1, wherein said press head comprises a plurality of claw assemblies disposed at the front end of said intermediate body and arranged at equal angular intervals around the axis of said pipe, each claw assembly being provided with a plurality of support members fixed at the front end of said intermediate body to be spaced from each other in the direction of an imaginary axis extending in a plane perpendicular to the axis of said pipes, a plurality of claws projecting forward from said intermediate body along the imaginary axis, a shaft permitting said support member to support the rear end of said claw such that said claw is rotated angularly about an axis orthogonal to the imaginary axis, a plate for interconnecting the front ends of said claws with each other and a leaf spring for giving to said claw a force adapted for rotating said claw about said shaft such that said claw abuts against the rear end face of one of said pipes, said claw being displaceable to a position where said claw is capable of abutting against the rear end face of one of said pipes when said intermediate thrusting means is advanced while being displaceable to another position where said claw does not interfere with the advance of the following pipes when the intermediate thrusting means is removed, and said claw being provided with a stopper portion capable of abutting against the front end face of said relay body to limit the angular rotation of said claw.

* * * * *